United States Patent
Behzadpour et al.

(10) Patent No.: US 11,685,503 B2
(45) Date of Patent: Jun. 27, 2023

(54) STRINGER ASSEMBLIES AND METHODS OF FORMING THEREOF

(71) Applicant: The Boeing Company, Chicago, IL (US)

(72) Inventors: Forouzan Behzadpour, Mukilteo, WA (US); Waeil M. Ashmawi, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 16/866,193

(22) Filed: May 4, 2020

(65) Prior Publication Data
US 2021/0339843 A1 Nov. 4, 2021

(51) Int. Cl.
*B64C 1/06* (2006.01)
*B29C 70/30* (2006.01)
*B29C 70/54* (2006.01)
*B29C 65/48* (2006.01)
*B29C 65/00* (2006.01)
*B29C 53/02* (2006.01)
*B29L 31/30* (2006.01)
*B64C 1/00* (2006.01)

(52) U.S. Cl.
CPC ............. *B64C 1/064* (2013.01); *B29C 53/02* (2013.01); *B29C 65/48* (2013.01); *B29C 66/729* (2013.01); *B29C 70/30* (2013.01); *B29C 70/545* (2013.01); *B29L 2031/3076* (2013.01); *B64C 2001/0072* (2013.01)

(58) Field of Classification Search
None
See application file for complete search history.

(56) References Cited

U.S. PATENT DOCUMENTS

| | | | |
|---|---|---|---|
| 4,113,910 A | * | 9/1978 | Loyd ............... B29C 66/131 403/374.1 |
| 2015/0217850 A1 | * | 8/2015 | Tien ............... B29D 99/0014 264/258 |

FOREIGN PATENT DOCUMENTS

| | | | | |
|---|---|---|---|---|
| EP | 2749405 A1 | * | 7/2014 | ............. B29C 70/34 |
| EP | 2946900 A1 | * | 11/2015 | ......... B29C 37/0082 |

OTHER PUBLICATIONS

Behzadpour, Forouzan et al., Stringer and Associated Composite Structure and Method for Reinforcing a Base Structure; U.S. Appl. No. 16/782,170, filed Feb. 5, 2020.

* cited by examiner

*Primary Examiner* — Barbara J Musser
(74) *Attorney, Agent, or Firm* — Kwan & Olynick LLP (57) ABSTRACT

Described herein are stringer assemblies, such as blade stringers, and methods of forming thereof. A stringer assembly comprises a first fabric composite stiffener, a second fabric composite stiffener, and an intermediate tape composite stiffener, disposed between and connected to each of the first and second stiffeners. Using three separate components allows forming sharp bends, eliminating voids and gap fillers, and adding new features, such as edge reinforcements. Each of the first and second fabric composite stiffeners comprises a web portion, a flange portion, and a curved portion, positioned between the web and flange portions. The web portions surround and are attached to the intermediate tape composite stiffener and, in some examples, include tapered-out edges for additional rigidity. The flange portions are attached to the composite base. The curved portions conform to the flared-out edges of the intermediate tape composite stiffener, which extends and connects to the composite base.

20 Claims, 8 Drawing Sheets

STRINGER ASSEMBLIES AND METHODS OF FORMING THEREOF

BACKGROUND

Modern aircraft designs use various components, such as stringers, to resist bending, torsional, shear, and direct loads. Stringers are typically formed from lightweight composites, such as tapes with fibers embedded into resin matrixes. Blade stringers represent a specific class of stringers, which is common in aircraft and other applications. However, manufacturing of all-tape blade stringers has been challenging. One particular challenge involves forming tape plies into blade stringers, particularly around sharp bends. Conventional methods for forming blade stringers involve complex build-up procedures using numerous parts including, for instance, gap fillers, There is a need for stringer assemblies and associated method for forming the stringer assemblies that involve less complex build-up procedures using fewer parts.

SUMMARY

Described herein are stringer assemblies, such as blade stringers, and methods of forming thereof. A stringer assembly comprises a first fabric composite stiffener, a second fabric composite stiffener, and an intermediate tape composite stiffener, disposed between and connected to each of the first and second stiffeners. In some examples, a first fabric composite stiffener is formed entirely from a composite fabric and may be referred to as a first all-fabric composite stiffener. Similarly, in some examples, a second fabric composite stiffener is formed entirely from a composite fabric and may be referred to as a second all-fabric composite stiffener. Finally, in some examples, an intermediate tape composite stiffener is formed entirely from a composite tape and may be referred to as an intermediate all-tape composite stiffener.

Composite tapes have much smaller widths than composite fabrics, e.g., a composite tape is typically at least about two times narrower, three times narrower, or even four times narrower than a composite fabric. In some examples, the width of the tape is up to about 400 millimeters or, more specifically, up to about 300 millimeters, which is typically limited by the tape application techniques. On the other hand, the width of composite fabrics is often as much as 760 millimeters or 152.0 millimeters, A composite part formed from a composite tape typically requires less surface treatment than that formed from a composite fabric. However, a composite fabric requires less material handling and tends to be easier to form on contours and corners, making it more suitable for the first and second composite stiffeners, described above. In general, composite fabrics have better drapability, allowing the fabrics to follow contours surfaces. The fabric integrity is maintained by the interlocking of the fibers. This produces undulation in the final form at the fiber scale, which improves drapability and damage resistance. On the other hand, composite tapes (e.g., unidirectional tapes) are straight and uncrimped. This results in the highest possible fiber properties in the intermediate tape composite stiffener. Crimp is another distinguishing factor such that different crimp levels influence fiber volume fraction, thickness of fabric, and/or mechanical performance of fabrics. High crimp leads to reduced tensile and compressive properties, increased shear modulus in the resulting composite, and fewer regions for localized delamination between individual yarns. As a result, composite tapes have higher axial stiffness composite fabrics, but tend to be less suitable for outer layers. Furthermore, a composite fabric tends to be more resistance to surface breakouts and delamination. Finally, composite tapes and composite fabrics differ in fiber arrangements. For example, fibers of composite fabrics are arrangement in a variety of forms, such as a plain weave, a harness satin, braided, and the like.

Using three separate components allows forming sharp bends, eliminating voids and gap fillers, and adding new features, such as edge reinforcements. Each of the first and second fabric composite stiffeners comprises a web portion, a flange portion, and a curved portion, positioned between the web and flange portions. The web portions surround and are attached to the intermediate tape composite stiffener and, in some examples, include tapered-out edges for additional rigidity. The flange portions are attached to the composite base. The curved portions conform to the flared-out edges of the intermediate tape composite stiffener, which extends and connects to the composite base.

In some examples, a stringer assembly comprises a first fabric composite stiffener and second fabric composite stiffener, each comprising a web portion, a flange portion, and a curved portion, disposed between the web portion and the flange portion. The web portion comprises a tapered-out edge. The stringer assembly further comprises an intermediate tape composite stiffener, disposed between the first fabric composite stiffener and the second fabric composite stiffener and comprising flared-out edges. Each flared-out edge contacts and conforms to a corresponding one of the curved portions of the first fabric composite stiffener and the second fabric composite stiffener.

In some examples, a method of forming a stringer assembly comprises joining a first end of an intermediate tape composite stiffener to a composite base. The first end comprises flared-out edges. The method further comprises joining a first fabric composite stiffener and a second fabric composite stiffener to the composite base and to the intermediate tape composite stiffener. Each of the first fabric composite stiffener and the second fabric composite stiffener comprises a web portion, a flange portion, and a curved portion, the curved portion disposed between the web portion and the flange portion. The curved portion conforms to a corresponding one of the flared-out edges of the intermediate tape composite stiffener.

In some examples, a method for forming a stringer assembly comprises forming a first fabric composite stiffener and a second fabric composite stiffener. The method further comprises joining a first end of an intermediate tape composite stiffener to a composite base. The first end comprises flared-out edges. The method comprises bending the first fabric composite stiffener and the second fabric composite stiffener to conform to the composite base and to the intermediate tape composite stiffener. Each of the first fabric composite stiffener and the second fabric composite stiffener comprises a web portion, a flange portion, and a curved portion, disposed between the web portion and the flange portion. After bending, the curved portion of each of the first fabric composite stiffener and the second fabric composite stiffener conforms to a corresponding one of the flared-out edges of the intermediate tape composite stiffener.

DETAILED DESCRIPTION

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Stringer assemblies, described herein, enable new stringer designs and features, such as sharper bends and reinforcement features. Furthermore, these stringer assemblies not only simplify manufacturing by eliminating complex operations and components, such as gap fillers, which are also known as "noodles", but these stringer assemblies also eliminate the persistent and consequential wrinkles and noodle cracking. These gap fillers have been a barrier for a broader application of composite structures with complex shapes due to manufacturing complexities and high costs. Overall, in comparison to conventional stringers and methods of fabricating thereof, these novel stringer assemblies provide less complex build-up procedures using fewer parts. Furthermore, these novel stringer assemblies allow implementation of various automation aspects during fabrication. These novel stringer assemblies also provide enhanced bending stiffness without a need for large structure heights. This feature is particularly helpful for small aircrafts, e.g., aircrafts with a small wing depth, which is defined as a distance between the centroid of the upper and lower wing panels. The minimal size of composite structures and, in particular, of composite stringers has been a limiting factor for new applications.

A novel stringer assembly comprises a first fabric composite stiffener, a second fabric composite stiffener, and an intermediate tape composite stiffener, disposed between the first fabric composite stiffener and the second fabric composite stiffener. More specifically, the intermediate tape composite stiffener directly interfaces and is bonded to portions of the first fabric composite stiffener and the second fabric composite stiffener, which are referred to as web portions. For example, the first fabric composite stiffener, the second fabric composite stiffener, and the intermediate tape composite stiffener are be first arranged into a sub-assembly (e.g., over a composite base). In this arrangement, the first fabric composite stiffener and the second fabric composite stiffener conform to the intermediate tape composite stiffener and to the composite base. This arrangement is then cured.

Having three separate components in a stringer assembly allows achieving sharp bends. Specifically, the thickness of each of the first and second fabric composite stiffeners is selected specifically based on the desired bend radius. In some examples, the intermediate tape composite stiffener is thicker than each of the first and second fabric composite stiffeners. However, unlike the first and second fabric composite stiffeners, the intermediate tape composite stiffener is not bent. Specifically, each of the first and second fabric composite stiffeners comprises a web portion, a flange portion, and a curved portion. The curved portion is positioned between the web and flange portions. The web portions surround and are attached to the intermediate tape composite stiffener, thereby increasing the overall thickness of the stringer assembly. The flange portions are attached to the composite base and extend away from the intermediate tape composite stiffener. Specifically, the flange portions provide a greater contact area between a sub-assembly of the first and second fabric composite stiffeners, the second fabric composite stiffener, and the intermediate tape composite stiffener and the composite base to which this sub-assembly is connected. The curved portions of the first and second fabric composite stiffeners conform to the flared-out edges of the intermediate tape composite stiffener, thereby preventing any gaps within the sub-assembly and the overall assembly, e.g., between the sub-assembly and the composite base.

Examples of Stringer Assemblies

Figure 1A:
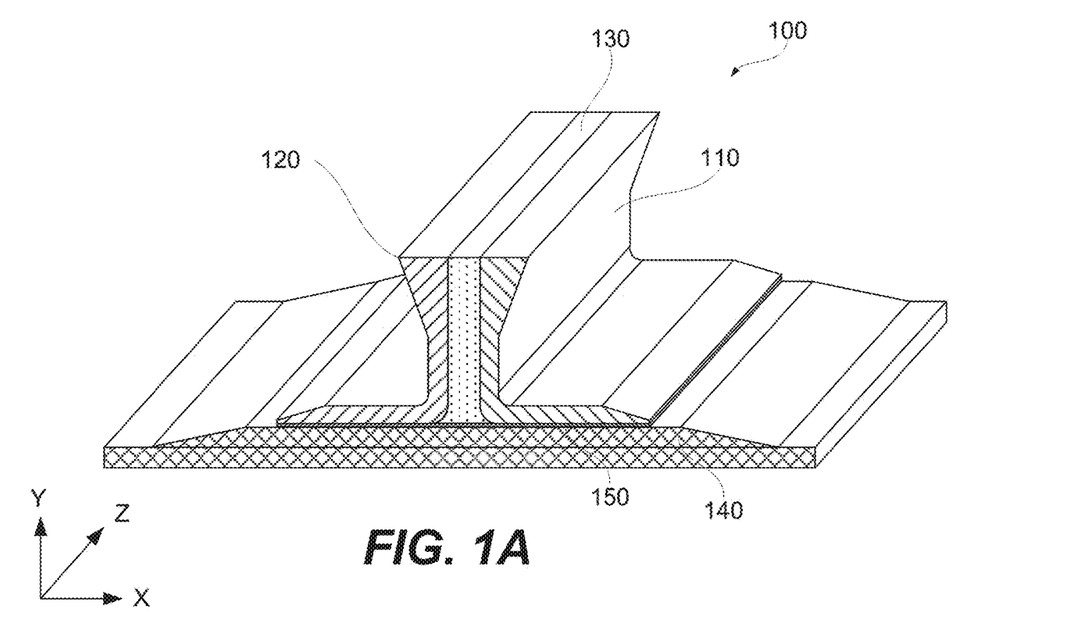
FIG. 1A is a schematic perspective view of a stringer assembly, comprising an intermediate tape composite stiffener, a first fabric composite stiffener, and second fabric composite stiffener, attached to a composite base, in accordance with some examples.

Referring to FIG. 1A, in some examples, stringer assembly 100 comprises first fabric composite stiffener 110, second fabric composite stiffener 120, and intermediate tape composite stiffener 130. Intermediate tape composite stiffener 130 is positioned between first fabric composite stiffener 110 and second fabric composite stiffener 120. More specifically, intermediate tape composite stiffener 130 is attached/bonded to each of first fabric composite stiffener 110 and second fabric composite stiffener 120. A combination of first fabric composite stiffener 110, second fabric composite stiffener 120, and intermediate tape composite stiffener 130 may be also referred to a sub-assembly.

As show in FIG. 1A, each of first fabric composite stiffener 110, second fabric composite stiffener 120, and intermediate tape composite stiffener 130 extends along the Z-axis, which may be referred to as a principal axis of stringer assembly 100. While FIG. 1A illustrates each of the sub-assemblies (e.g., first fabric composite stiffener 110, second fabric composite stiffener 120, and intermediate tape composite stiffener 130) is straight along the Z-axis, other examples are also within the scope. In some examples, the sub-assembly has one or more bends about the X-axis and/or one or more bends about the Y-axis. These bends are formed, e.g., prior to curing the sub-assembly.

Referring to FIG. 1A, in some examples, stringer assembly 100 comprises composite base 140. Each of first fabric composite stiffener 110, second fabric composite stiffener 120, and intermediate tape composite stiffener 130 is connected to composite base 140. More specifically, each of first fabric composite stiffener 110, second fabric composite stiffener 120, and intermediate tape composite stiffener 130 independently interfaces and is directly connected to composite base 140. For example, stringer assembly 100 comprises adhesive 150, which is disposed between and adheres to composite base 140 and each of first fabric composite stiffener 110, second fabric composite stiffener 120, and intermediate tape composite stiffener 130. In some examples, composite base 140 is an interleaved skin, Specifically, interleaving is defined as interspersing a limited number of zero degree fibers to a base skin. The interleaving skin under provides various structural and manufacturing benefits, such as (a) increasing the skin panel axial stiffness while keeping the centroid of the skin-stringer close to the skin minimizing eccentricity induced residual loads, (b) limiting crack propagating in a chord-wise direction within the skin.

Figure 1B:
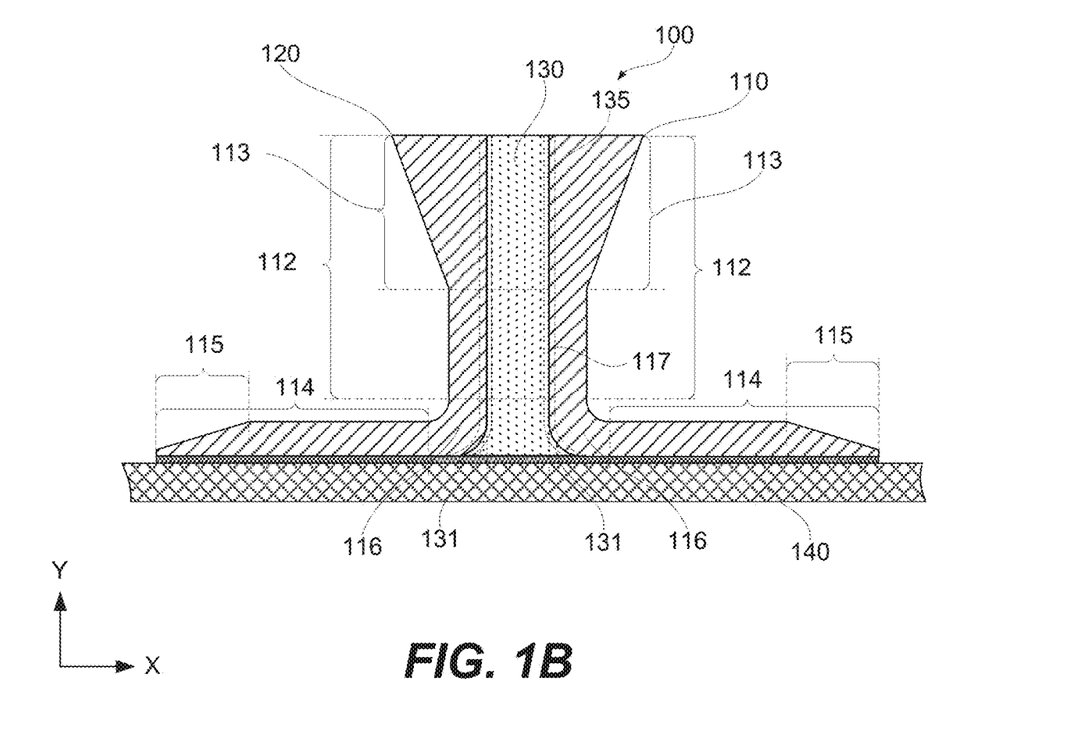
FIGS. 1B and 1C are schematic cross-sectional side views of the stringer assembly in FIG. 1A, in accordance with some examples.

Referring to FIG. 1B, in some examples, each of first fabric composite stiffener 110 and second fabric composite stiffener 120 comprises web portion 112, flange portion 114, and curved portion 116. Curved portion 116 is disposed between web portion 112 and flange portion 114 and monolithic with web portion 112 and flange portion 114. Within examples, web portion 112, flange portion 114, and curved portion 116 of both first fabric composite stiffener 110 and second fabric composite stiffener 120 are formed together from the same layup as further described below with reference to FIGS. 4A-4E.

In some examples, web portion 112 comprises tapered-out edge 113. Tapered-out edge 113 provides additional reinforcement to an end of stringer assembly 100, which extends away from composite base 140. For example, tapered-out edge 113 protects an end of stringer assembly 100 from various types of impacts (e.g., tools falling on stringer assembly 100), Furthermore, tapered-out edge 113 helps to provide additional stiffness to a sub-assembly of first fabric composite stiffener 110, intermediate tape composite stiffener 130, and second fabric composite stiffener 120.

Figure 1C:
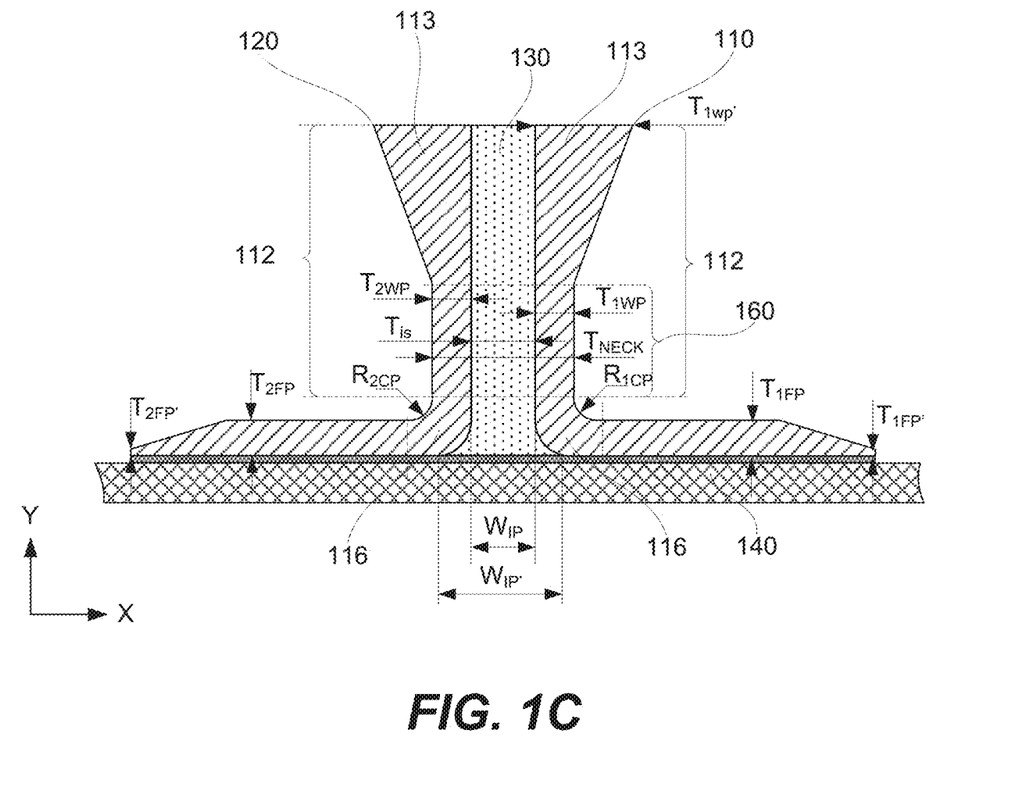

In some examples, tapered-out edge 113 is characterized by thickness differences of web portion 112 at tapered-out edge 113 and away from tapered-out edge 113. FIG. 1C illustrates the thickness ($T_{1WP'}$) of web portion 112 at the widest point of tapered-out edge 113, e.g., at the end of web portion 112 furthest away from composite base 140. FIG. 1C also illustrates the thickness ($T_{1WP}$) of web portion 112 away from tapered-out edge 113, e.g., at neck portion 160. In some examples, the ratio of these thicknesses ($T_{1WP'}/T_{1WP}$) is between 1.1 and 2.0. In some examples, the ratio of these thicknesses ($T_{1WP'}/T_{1WP}$) is, more specifically, between 1.2 and 1.6. As such, the tapered-out edge 113 of web portion 112 is between 10% and 100% thicker or, more specifically, 20% to 60% thicker than the remaining part of web portion 112. In some examples, the length of tapered-out edge 113 (in the Y direction) relative to the over length of web portion 112 is between 0.2 and 1. In some examples, the length of tapered-out edge 113 (in the Y direction) relative to the over length of web portion 112 is between 0.4 and 0.8.

Referring to FIG. 1B, in some examples, flange portion 114 of each of first fabric composite stiffener 110 and second fabric composite stiffener 120 comprises tapered-in edge 115. More specifically, tapered-in edge 115 is positioned at the end of each flange portion 114, i.e., the end that extends away from intermediate tape composite stiffener 130. Flange portion 114 is attached to composite base 140 and provides additional reinforcement to composite base 140, Tapered-in edge 115 provides a gradual transition in support to composite base 140. Specifically, this support ranges from a full support (provided by a part of flange portion 114 away from tapered-in edge 115, i.e., the part of flange portion 114 having a full thickness) to no support. As such, composite base 140 does not experience a rapid drop in mechanical support (e.g., from the full support to no support) at the end of each flange portion 114.

In some examples, tapered-in edge 115 is characterized by thickness differences of flange portion 114 at tapered-in edge 115 and away from tapered-in edge 115. FIG. 1C illustrates the thickness ($T_{1FP'}$) of flange portion 114 at the narrowing point of tapered-in edge 115, e.g., at the end of flange portion 114 furthest away from intermediate tape composite stiffener 130. FIG. 1C, also illustrates the thickness ($T_{1FP}$) of flange portion 114, away from tapered-in edge 115. In some examples, the ratio of these thicknesses ($T_{1FP'}/T_{1FP}$) is between 0.1 and 0.8, In some examples, the ratio of these thicknesses ($T_{1FP'}/T_{1FP}$) is between 0.2 and 0.5, In some examples, the length of tapered-in edge 115 (in the X direction) relative to the over length of flange portion 114 is between 0.2 and 1. In some examples, the length of tapered-in edge 115 (in the X direction) relative to the over length of flange portion 114 is between 0.4 and 0.8.

In some examples, web portion 112 and flange portion 114 of each of first fabric composite stiffener 110 and second fabric composite stiffener 120 are substantially perpendicular. Flange portion 114 conforms to the surface of composite base 140. Web portion 112 extends away from this surface of composite base 140 and provides rigidity to composite base 140. The perpendicular orientation provides the greatest degree of extension from composite base 140 for a given height of web portion 112. Furthermore, the perpendicular orientation helps to resist certain bend angles, e.g., about the X-axis. For purposes of this disclosure, the term "substantially perpendicular" is defined as an angle of between 80° and 100°. In some examples, the substantially perpendicular orientation is between 85° and 95°.

Referring to FIG. 1C, in some examples, the interior radius ($R_{1CP}$ or $R_{2CP}$) of curved portion 116 is between 3-10 millimeters or, more specifically, between 4-7 millimeters. While layups tend to be difficult to bend, the separation of stringer assembly 100 into three independent components (i.e., first fabric composite stiffener 110, intermediate tape composite stiffener 130, and second fabric composite stiffener 120) provides additional flexibility. First fabric composite stiffener 110 and second fabric composite stiffener 120 are bent prior to bonding to intermediate tape composite stiffener 130. In other words, first fabric composite stiffener 110 and second fabric composite stiffener 120 are bent individually, allowing for sharper bends, in comparison to, e.g., bending the entire sub-assembly in a joint state. It should be noted that, in some examples, intermediate tape composite stiffener 130 is used as a form for shaping first fabric composite stiffener 110 and second fabric composite stiffener 120. In other words, first fabric composite stiffener 110 and second fabric composite stiffener 120 are bent against intermediate tape composite stiffener 130 and the intermediate tape composite stiffener 130 acts as a forming tool during this bending operation.

Referring to FIG. 1B, intermediate tape composite stiffener 130 is disposed between first fabric composite stiffener 110 and second fabric composite stiffener 120. More specifically, intermediate tape composite stiffener 130 contacts and conforms to web portion 112 and curved portion 116 of each of first fabric composite stiffener 110 and second fabric composite stiffener 120. Furthermore, intermediate tape composite stiffener 130 comprises flared-out edges 131. For instance, as seen in FIG. 1B, intermediate tape composite stiffener 130 includes two flared-out edges. Flared-out edges 131 are configured to fill any gap between intermediate tape composite stiffener 130 and each of first fabric composite stiffener 110 and second fabric composite stiffener 120, and in particular, between intermediate tape composite stiffener 130 and curved portion 116 of each of first fabric composite stiffener 110 and second fabric composite stiffener 120. Curved portion 116 has a certain exterior radius, which is filled by flared-out edges 131. Each of flared-out edges 131 contacts and conforms to a corresponding one of curved portions 116 of first fabric composite stiffener 110 and second fabric composite stiffener 120. That is, one of flared-out edges 131 of intermediate tape composite stiffener 130 contacts and conforms to curved portion 116 of first fabric composite stiffener 110, while the other one of flared-out edges 131 of intermediate tape composite stiffener 130 contacts and conforms to curved portion 116 of second fabric composite stiffener 120.

Referring to FIG. 1B, in some examples, intermediate tape composite stiffener 130 comprises outer layer tapes 135, identified with dashed lines. Outer layer tapes 135 directly face each of first fabric composite stiffener 110 and second fabric composite stiffener 120. Furthermore, in some examples, outer layer tapes 135 have a 0°-match to contacting fabric 117 of web portion 112 of each of first fabric composite stiffener 110 and second fabric composite stiffener 120. Contacting fabric 117 is also identified with dashed lines in FIG. 1B. This 0°-match enhances bonding and allows uniform load transition between intermediate tape composite stiffener 130 and each of first fabric composite stiffener 110 and second fabric composite stiffener 120.

In some examples, intermediate tape composite stiffener 130 comprises a unidirectional tape reinforcement material. Furthermore, in some examples, the composition of intermediate tape composite stiffener 130 is substantially uniform throughout an entire volume of intermediate tape composite stiffener 130, including flared-out edges 131, For purposes of this disclosure, the term "substantially uniform" is defined as different parts of the components are made from the same set of material system. It should be noted that a component may include multiple materials (e.g., fibers and resins) such that the distribution of these materials is substantially the same within different areas of the component.

Intermediate tape composite stiffener 130 is bonded to each of first fabric composite stiffener 110 and second fabric composite stiffener 120. For example, intermediate tape composite stiffener 130 is adhered (e.g., using adhesive) or otherwise bonded to each of first fabric composite stiffener 110 and second fabric composite stiffener 120 during fabrication of stringer assembly 100 as further described below with reference to FIGS. 2 and 3, For example, a subassembly of first fabric composite stiffener 110, intermediate tape composite stiffener 130, and second fabric composite stiffener 120 is cured together, which may be also referred to as a co-curing. More specifically, intermediate tape composite stiffener 130 is bonded to web portion 112 and curved portion 116 of each of first fabric composite stiffener 110 and second fabric composite stiffener 120. At the same time, flange portion 114 is bonded to composite base 140. Similarly, intermediate tape composite stiffener 130 is also bonded to composite base 140.

Referring to FIG. 1C, in some examples, intermediate tape composite stiffener 130 and web portion 112 of each of first fabric composite stiffener 110 and second fabric composite stiffener 120 form neck portion 160. Neck portion 160 is positioned away from tapered-out edge 113 or, more specifically, between tapered-out edge 113 and curved portion 116 of each of first fabric composite stiffener 110 and second fabric composite stiffener 120. The thickness of neck portion 160 ($T_{neck}$) is a combination of multiple thicknesses, i.e., the thickness ($T_{is}$) of intermediate tape composite stiffener 130, the thickness ($T_{1wp}$) of web portion 112 of first fabric composite stiffener 110, and the thickness ($T_{2wp}$) of web portion 112 of second fabric composite stiffener 120. It should be noted that in some examples, the thickness ($T_{1wp}$) of web portion 112 of first fabric composite stiffener 110 is the same as the thickness ($T_{2wp}$) of web portion 112 of second fabric composite stiffener 120 (e.g., $T_{1wp}=T_{2wp}$). In some examples, the thickness ratio ($T_{is}/T_{neck}$) of intermediate tape composite stiffener 130 ($T_{is}$) relative to neck portion 160 ($T_{neck}$) is at least 0.3 or even at least 0.5. In other words, intermediate tape composite stiffener 130 represents at least 30% of the total thickness or even at least 50%. In some examples, the thickness ratio ($T_{1w}/T_{neck}$) of web portion 112 relative to neck portion 160 is less than 0.5. In some examples, the thickness ratio of web portion 112, at the widest point of tapered-out edge 113, relative to web portion 112, at neck portion 160, is between 1.2 and 1.6.

In some examples, stringer assembly 100 is a part of an aircraft, such as a winged aircraft. For example, stringer assembly 100 is used as a stiffening member for supporting a skin, in particular, a load carrying skin, such as a skin on aircraft wings. More specifically, stringer assembly 100 presents the skin from bending when compression and/or shear loads are applied to the skin. Furthermore, stringer assembly 100 is used to transfer loads (e.g., acting on the skin) to an aircraft frame. Aircraft applications of stringer assembly 100 include, but are not limited to, wings, stabilizers, fuselage, and the like.

Within examples, stringer assembly 100, disclosed herein, provides enhanced bending stiffness without having large structure heights. Stringer assembly 100 is able to provide desired wing bending stiffness for aircrafts with small wing depth (e.g., short wing depth). Furthermore, in some examples, stringer assembly 100 have shortened web height compared to conventional blade stringer assemblies, and the tapered-out edges of the web portion can help compensate for the shortened web height.

Examples of Methods of Forming Stringer Assemblies

Figure 2:
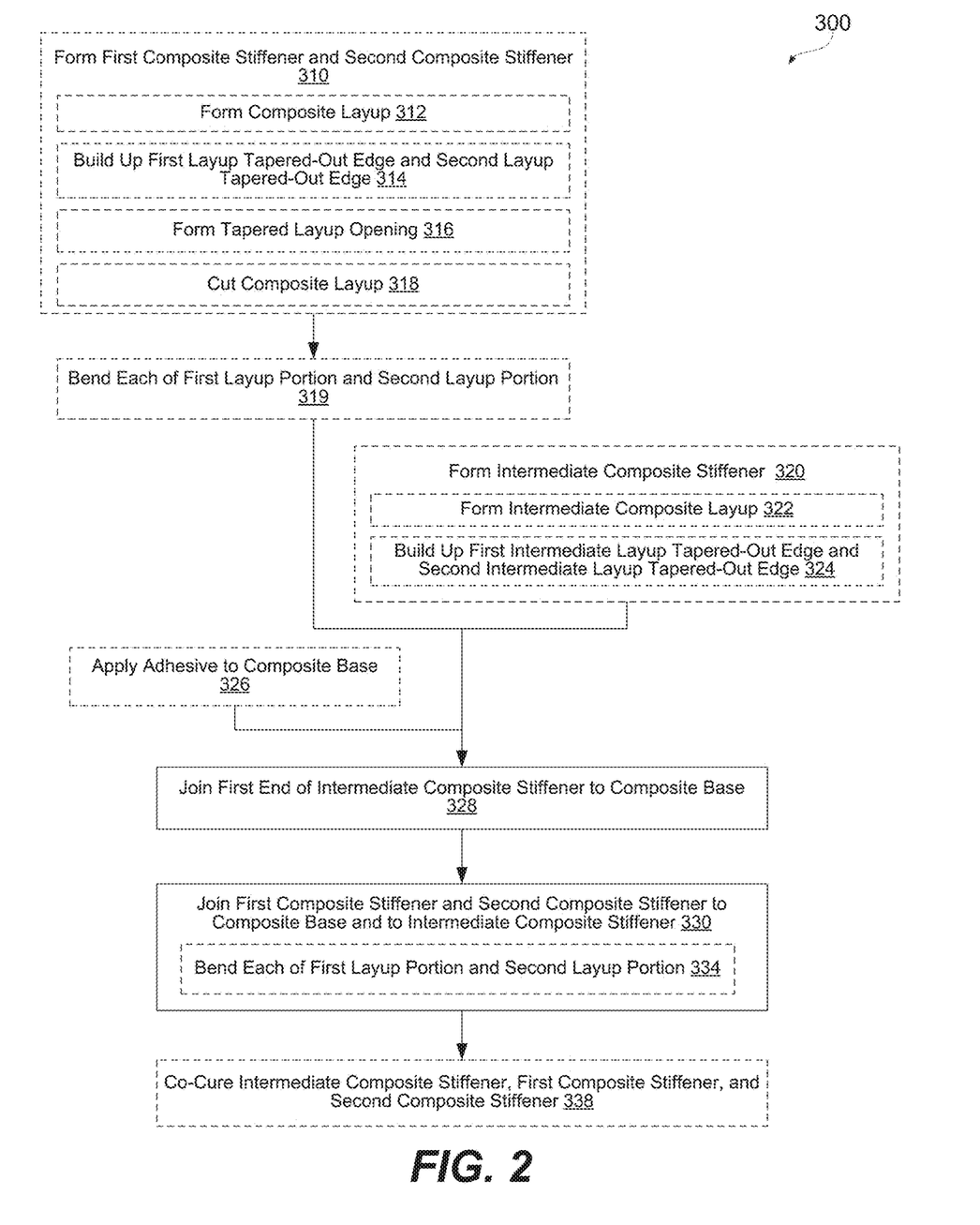
FIGS. 2 and 3 are process flowcharts corresponding to various examples of a method of forming a stringer assembly.

FIG. 2 is a process flowchart corresponding to method 300 for forming stringer assembly 100. Various examples of stringer assembly 100 are described above with reference to FIGS. 1A-1C. Furthermore, various applications of stringer assembly 100 are described below with reference to FIGS. 7 and 8, Various types of production equipment may be used for operations of method 300, such as composite layup equipment, composite curing equipment, and the like.

In some examples, method 300 comprises forming (block 310) first fabric composite stiffener 110 and second fabric composite stiffener 120. It should be noted that first fabric composite stiffener 110 and second fabric composite stiffener 120 are formed independently from intermediate tape composite stiffener 130. The process of forming intermediate tape composite stiffener 130 is described below. Therefore, in some examples, the material of intermediate tape composite stiffener 130 is different from the first fabric composite stiffener 110 and second fabric composite stiffener 120.

Figure 4A:
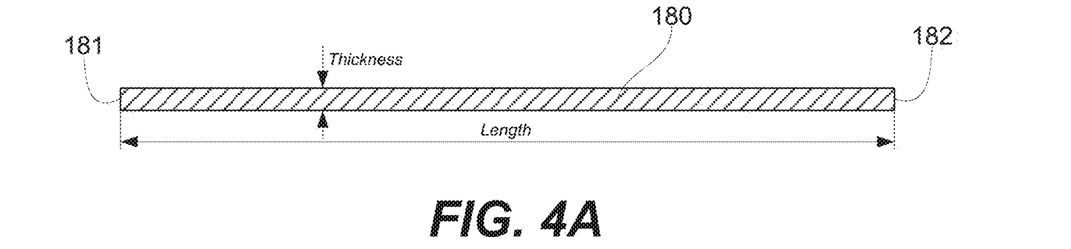
FIGS. 4A-4E are schematic illustrations of different stages of forming a first fabric composite stiffener and a second fabric composite stiffener, in accordance with some examples.

Referring to FIG. 2, in some examples, the process (block 310) of forming first fabric composite stiffener 110 and second fabric composite stiffener 120 starts with forming (block 312) composite layup 180. In some examples, composite layup 180 is formed by laying up one or more layers of composite sheets of a temporary support. FIG. 4A is a schematic representation of composite layup 180. Composite layup 180 comprises first layup end 181 and second layup end 182, opposite of first layup end 181. The thickness of composite layup 180 is determined by the thickness of each of web portion 112, flange portion 114, and curved portion 116. In some examples, web portion 112, flange portion 114, and curved portion 116 of both first fabric composite stiffener 110 and second fabric composite stiffener 120 have the same thickness, with exception of tapered-out edge 113 and tapered-in edge 115. The length/width of composite layup 180 is determined by a combined length of web portion 112, flange portion 114, and curved portion 116 of both first fabric composite stiffener 110 and second fabric composite stiffener 120, with reference to the cross-section of stringer assembly 100 shown in FIG. 1C.

Figure 4B:
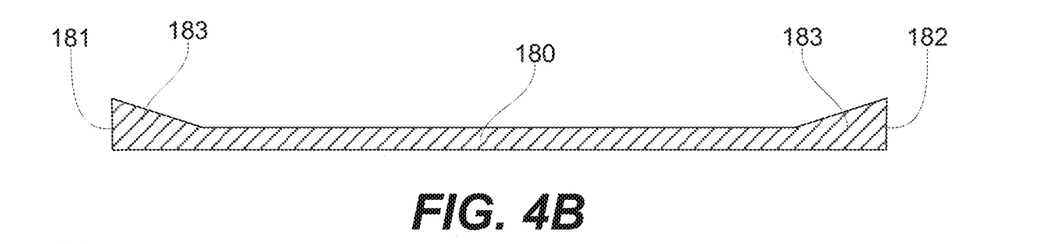

Referring to FIG. 2, in some examples, the process (block 310) of forming first fabric composite stiffener 110 and second fabric composite stiffener 120 continues with building up (block 314) layup tapered-out edge 183 at each of first layup end 181 and second layup end 182. FIG. 4B is a schematic representation of composite layup 180 with layup tapered-out edge 183 formed on each of first layup end 181 and second layup end 182. It should be noted that layup tapered-out edge 183 correspond to tapered-out edges 113, various examples and features of which are described above.

Figure 4C:
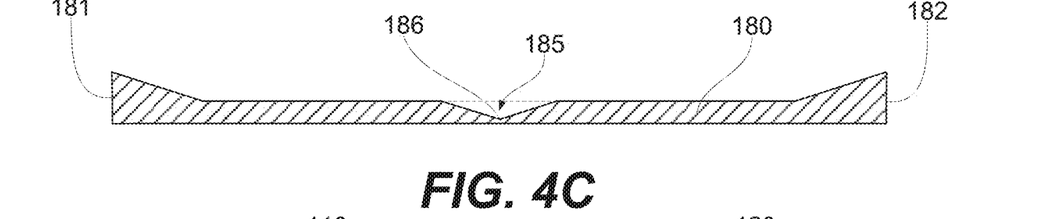

Referring to FIG. 2, in some examples, the process (block 310) of forming first fabric composite stiffener 110 and second fabric composite stiffener 120 continues with forming (block 316) tapered layup opening 185 between first layup end 181 and second layup end 182. FIG. 4C is a schematic representation of composite layup 180 after tapered layup opening 185 is formed. For example, a portion of composite layup 180 is removed by selective cutting. In some examples, tapered layup opening 185 is formed in intermediate portion 186 of composite layup 180, e.g., in the middle between first layup end 181 and second layup end 182. The size of tapered layup opening 185 depends on the size of tapered-in edge 115, which is described above.

Figure 4D:
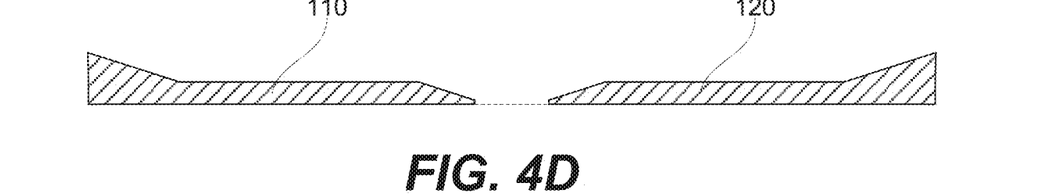

Referring to FIG. 2, in some examples, the process (block 310) of forming first fabric composite stiffener 110 and second fabric composite stiffener 120 continues with cutting (block 318) composite layup 180 between first layup end 181 and second layup end 182. FIG. 4D is a schematic representation after cutting composite layup 180, which forms first fabric composite stiffener 110 and second fabric composite stiffener 120. In some examples, composite layup 180 is cut in intermediate portion 186 of composite layup 180, e.g., in the middle between first layup end 181 and second layup end 182. In more specific examples, composite layup 180 is cut within tapered layup opening 185. Furthermore, in some examples, first fabric composite stiffener 110 and second fabric composite stiffener 120 are substantially planar.

Figure 4E:
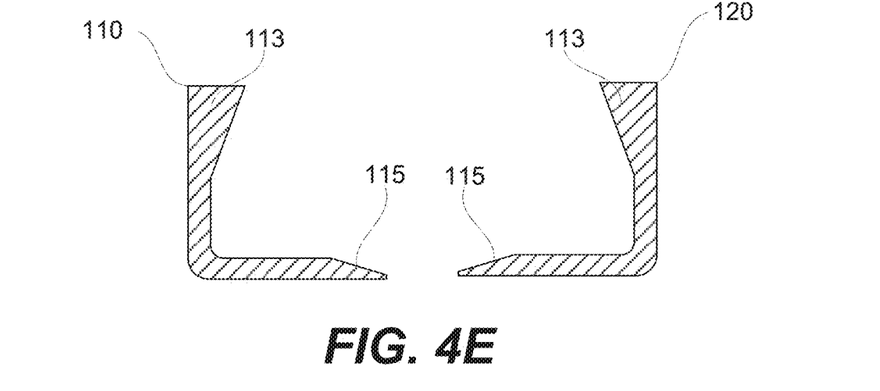

In some examples, method 300 further comprises bending (block 319 and/or block 334) each of first fabric composite stiffener 110 and second fabric composite stiffener 120. Block 319 refers to the operation when first fabric composite stiffener 110 and second fabric composite stiffener 120 are bent in in a standalone operation as, for example, is schematically shown in FIG. 4E. Block 334 refers to the operation when first fabric composite stiffener 110 and second fabric composite stiffener 120 are bent while being conformed to intermediate tape composite stiffener 130. More specifically, each of first fabric composite stiffener 110 and second fabric composite stiffener 120 is bent against intermediate tape composite stiffener 130 until curved portion 116 conforms to flared-out edges 131 of intermediate tape composite stiffener 130, which is further described below. In some examples, operations corresponding to both block 319 and block 334 are performed. For example, first fabric composite stiffener 110 and second fabric composite stiffener 120 are first pre-bent (block 319) and later further bent (block 334) to conform to intermediate tape composite stiffener 130.

Figure 5A:
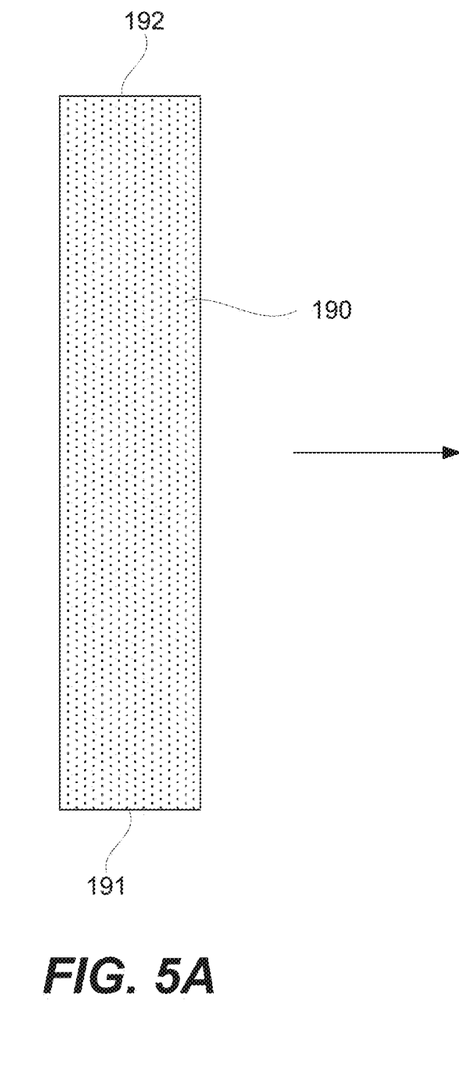
FIGS. 5A-5B are schematic illustrations of different stages of forming an intermediate tape composite stiffener, in accordance with some examples.
Figure 5B:
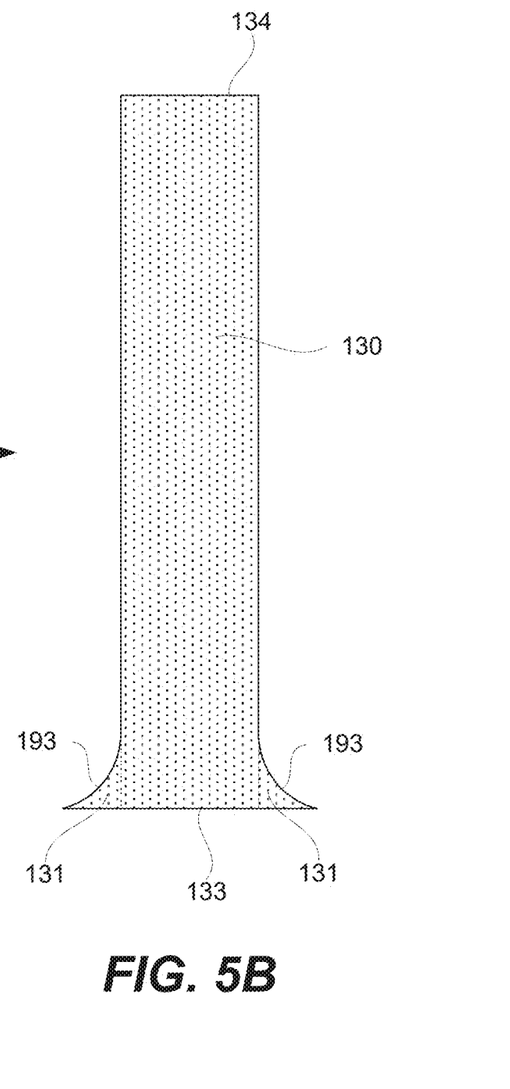

In some examples, method 300 further comprises forming (block 320) intermediate tape composite stiffener 130. More specifically, this operation involves forming (block 322) intermediate composite layup 190 (e.g., shown in FIG. 5A) and building up (block 324) intermediate layup tapered-out edges 193 at first intermediate layup end 191 (e.g., shown in FIG. 5B). In some examples, intermediate composite layup 190 is formed by laying up one or more layers of composites sheets. Referring to FIG. 5A, intermediate composite layup 190 comprises first intermediate layup end 191 and second intermediate layup end 192, opposite of first intermediate layup end 191. Referring to FIG. 5B, intermediate layup tapered-out edges 193 are formed at first intermediate layup end 191. First intermediate layup end 191 corresponds to first end 133, when intermediate composite layup 190 is formed in intermediate tape composite stiffener 130.

The thickness of intermediate composite layup 190 is determined by the thickness of intermediate tape composite stiffener 130, away from flared-out edges 131. The length of intermediate composite layup 190 is determined by the height of intermediate tape composite stiffener 130.

In some examples, method 300 further comprises applying (block 326) adhesive 150 to composite base 140. Adhesive 150 joins first end 133 of intermediate tape composite stiffener 130 and each of first fabric composite stiffener 110 and second fabric composite stiffener 120 to composite base 140. In some examples, adhesive 150 gap-fills spacing (e.g., fills remaining gaps) between flared-out edges 131 and curved portion 116 of each of first fabric composite stiffener 110 and second fabric composite stiffener 120. However, unlike conventional stringer assembly processes, no special gap fillers (e.g., "noodles") are used herein.

Figure 6A:
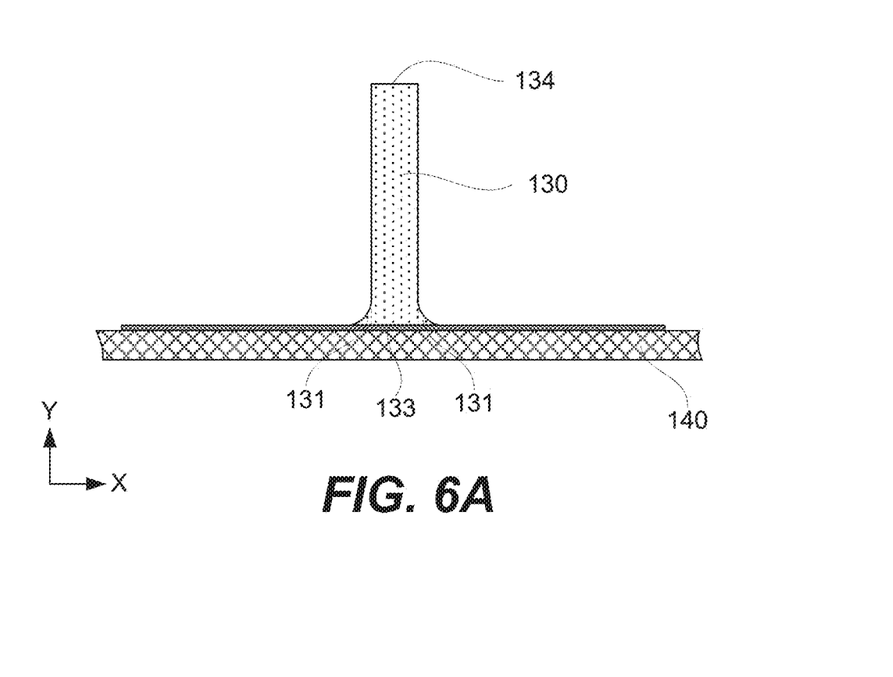
FIGS. 6A-6B are schematic illustrations of different stages of forming a stringer assembly, in accordance with some examples.

Method 300 comprises joining (block 328) first end 133 of intermediate tape composite stiffener 130 to composite base 140 as, e.g., is shown in FIG. 6A. In some examples, first end 133 comprises flared-out edges 131. Flared-out edges 131 provide additional contact surfaces between intermediate tape composite stiffener 130 and composite base 140 as well as conformance to first fabric composite stiffener 110 and second fabric composite stiffener 120 as further described below. At this stage, intermediate tape composite stiffener 130 is not permanently attached to composite base 140; this attachment is performed at later stages.

Figure 6B:
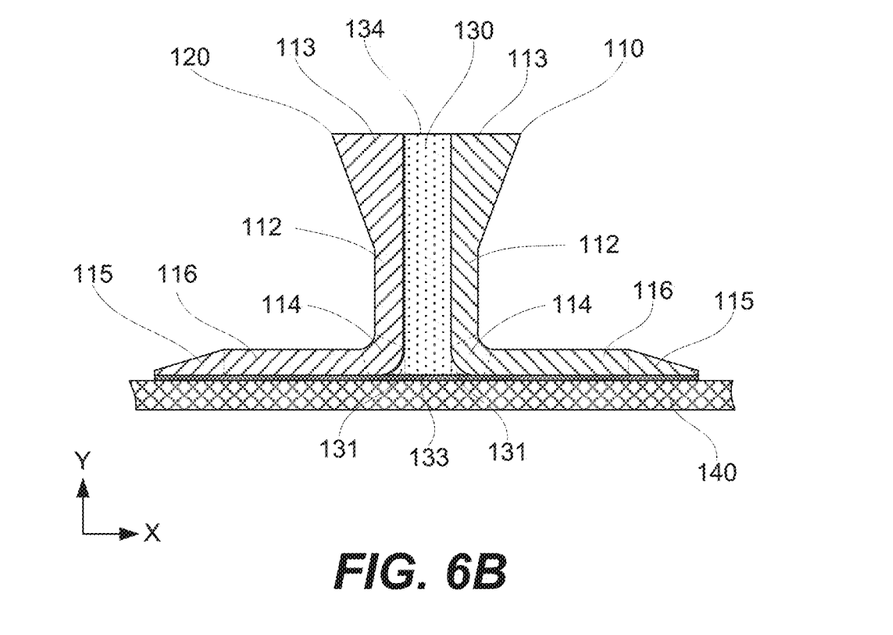

Method 300 comprises joining (block 330) first fabric composite stiffener 110 and second fabric composite stiffener 120 to composite base 140 and also to intermediate tape composite stiffener 130 as, e.g., is shown in FIG. 6B. In some examples, each of first fabric composite stiffener 110 and second fabric composite stiffener 120 comprises web portion 112, flange portion 114, and curved portion 116, disposed between web portion 112 and flange portion 114. After this joining operation, each curved portion 116 of first fabric composite stiffener 110 and second fabric composite stiffener 120 conforms to a corresponding one of the flared-out edges 131 of intermediate tape composite stiffener 130. That is, curved portion 116 of first fabric composite stiffener 110 conforms to one of flared-out edges 131 of intermediate tape composite stiffener 130 and curved portion 116 of second fabric composite stiffener 120 conforms to the other one of flared-out edges 131 of intermediate tape composite stiffener 130.

In some examples, first fabric composite stiffener 110 and second fabric composite stiffener 120 are bent (block 334) while being conformed to intermediate tape composite stiffener 130. More specifically, each of first fabric composite stiffener 110 and second fabric composite stiffener 120 is bent against intermediate tape composite stiffener 130 until curved portion 116 of each of first fabric composite stiffener 110 and second fabric composite stiffener 120 conforms to a corresponding one flared-out edges 131 of intermediate tape composite stiffener 130, which is further described below. In other words, intermediate tape composite stiffener 130 is used as a forming tool during this operation.

In some examples, method 300 further comprises co-curing (block 338) intermediate tape composite stiffener 130, first fabric composite stiffener 110, and second fabric composite stiffener 120. During this operation, intermediate tape composite stiffener 130, first fabric composite stiffener 110, and second fabric composite stiffener 120 are bonded together. Furthermore, during this operation, intermediate tape composite stiffener 130, first fabric composite stiffener 110, and second fabric composite stiffener 120 are each bonded to composite base 140.

Figure 3:
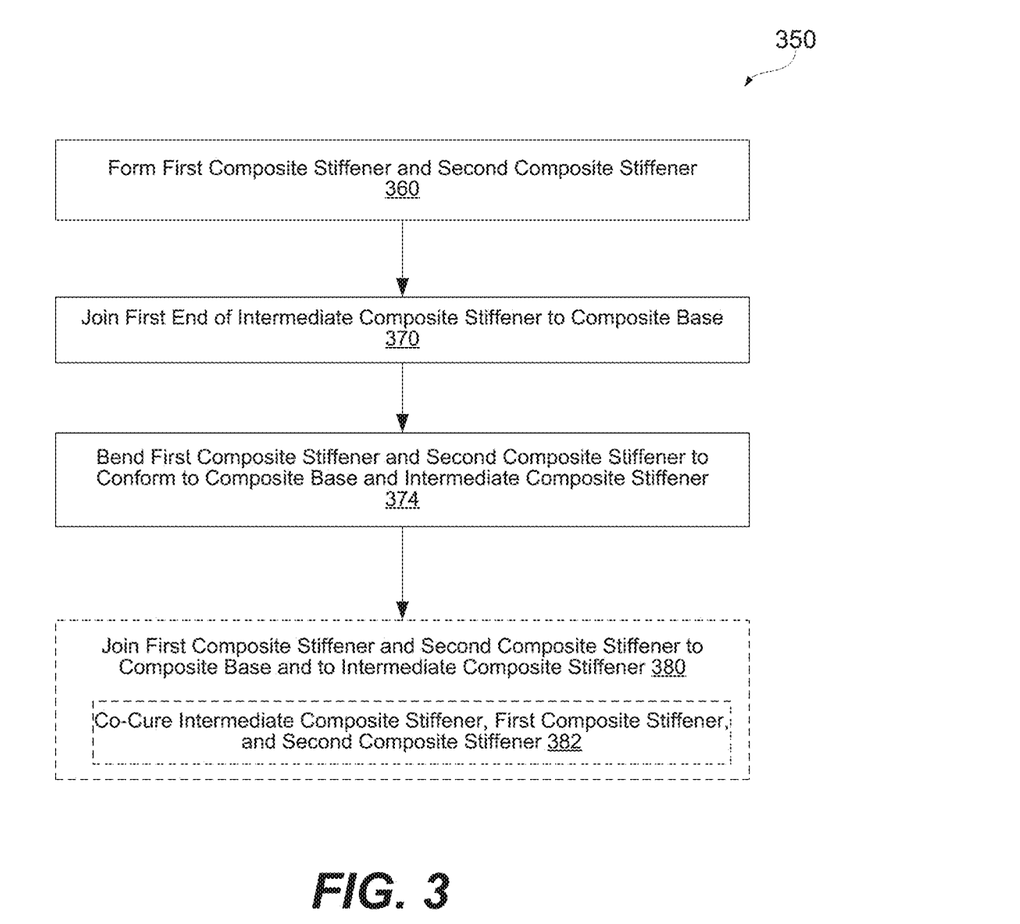

FIG. 3 is a schematic illustration of method 350 for forming stringer assembly 100, in accordance with some examples. Method 350 comprises forming (block 360) first fabric composite stiffener 110 and second fabric composite stiffener 120. In some examples, this operation is similar to the operation corresponding to block 310, described above with reference to FIG. 2 and FIGS. 4A-4E.

Method 350 comprises joining (block 370) first end 133 of intermediate tape composite stiffener 130 to composite base 140, with first end 133 comprising flared-out edges 131. In some examples, this operation is similar to the operation corresponding to block 328, described above with reference to FIG. 2 and FIG. 6A. Specifically, first end 133 comprises flared-out edges 131, which provide additional contact surfaces between intermediate tape composite stiffener 130 and composite base 140 as well as conforming to first fabric composite stiffener 110 and second fabric composite stiffener 120 as further described below.

Method 350 comprises bending (block 374) first fabric composite stiffener 110 and second fabric composite stiffener 120 to conform to composite base 140 and to intermediate tape composite stiffener 130. As described above, each of first fabric composite stiffener 110 and second fabric composite stiffener 120 comprises web portion 112, flange portion 114, and curved portion 116, disposed between web portion 112 and flange portion 114. In some examples, prior to bending, each of first fabric composite stiffener 110 and second fabric composite stiffener 120 are substantially planar.

During this bending operation, each curved portion 116 is formed and conforms to a corresponding one of the flared-out edges 131 of intermediate tape composite stiffener 130. More specifically, after bending, curved portion 116 of each of first fabric composite stiffener 110 and second fabric composite stiffener 120 conforms to one of the flared-out edges 131 of intermediate tape composite stiffener 130. It should be noted that intermediate tape composite stiffener 130 and composite base 140 act as a forming tool during this bending operation.

Furthermore, the ends of web portion 112 and intermediate tape composite stiffener 130 are aligned during this bending operation. In some examples, web portion 112 comprises tapered-out edge 113. Second end 134 of intermediate tape composite stiffener 130, opposite of first end 133, is positioned between tapered-out edge 113 of first fabric composite stiffener 110 and tapered-out edge 113 of second fabric composite stiffener 120.

Overall, in some examples, after bending, web portion 112 of each of first fabric composite stiffener 110 and second fabric composite stiffener 120 conforms to intermediate tape composite stiffener 130. Flange portion 114 of each of first fabric composite stiffener 110 and second fabric composite stiffener 120 conforms to composite base 140.

In some examples, method 350 further comprises joining (block 380) first fabric composite stiffener 110 and second fabric composite stiffener 120 to each of composite base 140 and intermediate tape composite stiffener 130. In some examples, this operation is similar to the operation corresponding to block 330, described above with reference to FIG. 2 and FIG. 6A, In more specific examples, joining (block 380) first fabric composite stiffener 110 and second fabric composite stiffener 120 to each of composite base 140 and intermediate tape composite stiffener 130 comprises co-curing (block 382) intermediate tape composite stiffener 130, first fabric composite stiffener 110, and second fabric composite stiffener 120.

Aircraft Examples

In some examples, methods and systems described above are used on aircraft and, more generally, by the aerospace industry. Specifically, these methods and systems can be used during fabrication of aircraft as well as during aircraft service and maintenance.

Figure 7:
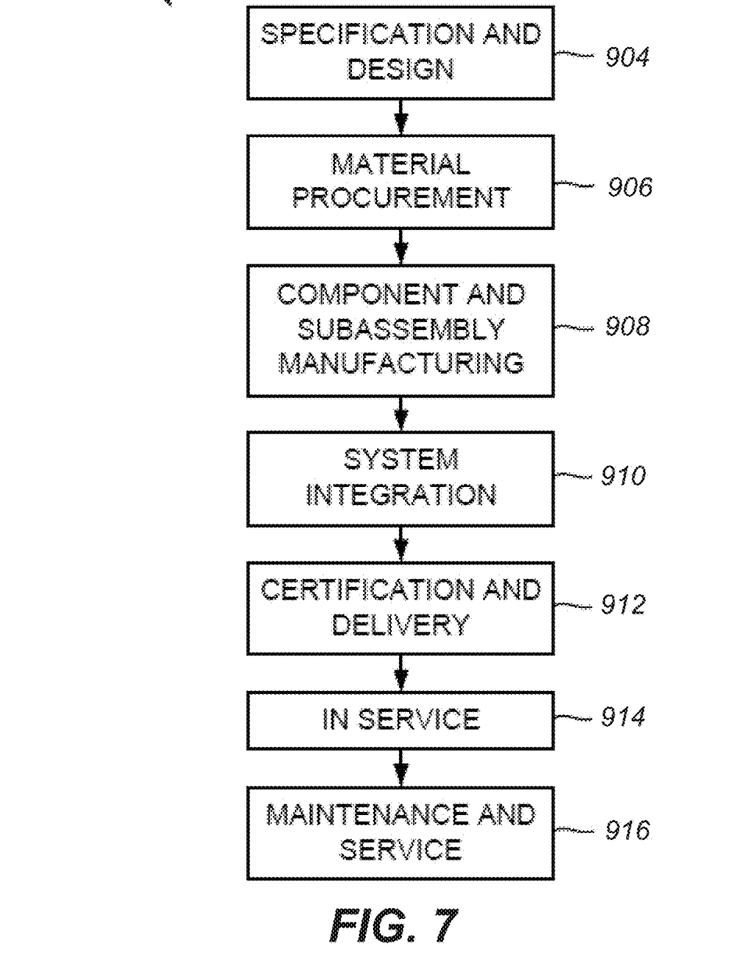
FIG. 7 is a process flowchart corresponding to a method for manufacturing and servicing the aircraft.
Figure 8:
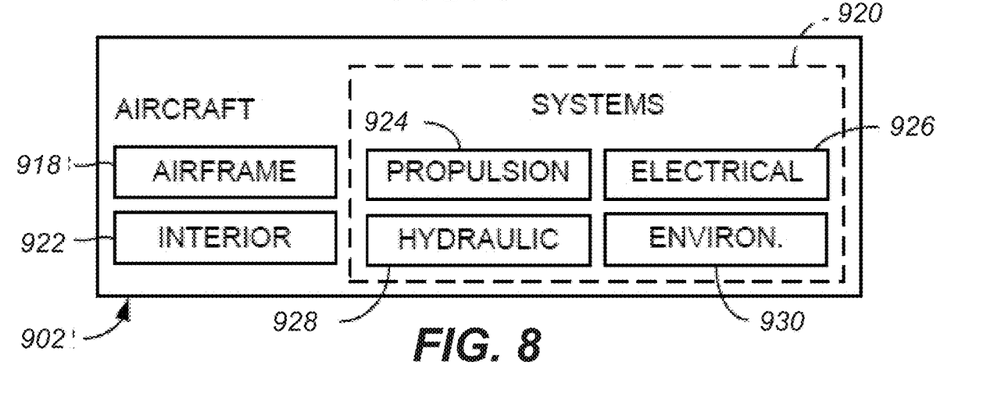
FIG. 8 illustrates a block diagram of an example aircraft, in accordance with some examples.

Accordingly, the apparatus and methods described above are applicable for aircraft manufacturing and service method 900 as shown in FIG. 7 and for aircraft 902 as shown in FIG. 8. During pre-production, method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For the purposes of this description, a system integrator includes without limitation any number of aircraft manufacturers and major-system subcontractors; a third party includes without limitation any number of venders, subcontractors, and suppliers; and an operator can be an airline, leasing company, military entity, service organization, and so on.

As shown in FIG. 8, aircraft 902 produced by method 900 includes airframe 918 with plurality of systems 920, and interior 922. The airframe 918 includes wings of the aircraft 902. Examples of systems 920 include one or more of propulsion system 924, electrical system 926, hydraulic system 928, and environmental system 930. Any number of other systems can be included. Although an aerospace example is shown, the principles of the examples described herein is applied to other industries, such as the automotive industry.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof is utilized during manufacturing 908 and system integration 910, for example, by substantially expediting assembly of or reducing the cost of an aircraft 902. Similarly, one or more of apparatus examples, method examples, or a combination thereof is utilized while aircraft 902 is in service, for example and without limitation, to maintenance and service 916.

Further Examples

Further, description includes examples according to following clauses:

Clause 1. A stringer assembly comprising:
a first fabric composite stiffener and second fabric composite stiffener, each comprising a web portion, a flange portion, and a curved portion, disposed between the web portion and the flange portion, wherein the web portion comprises a tapered-out edge; and
an intermediate tape composite stiffener, disposed between the first fabric composite stiffener and the second fabric composite stiffener and comprising flared-out edges, each of the flared-out edges contacting and conforming to a corresponding one the curved portions of the first fabric composite stiffener and the second fabric composite stiffener.

Clause 2. The stringer assembly of clause 1, further comprising a composite base and an adhesive, disposed between and adhering to the composite base and each of the first fabric composite stiffener, the second fabric composite stiffener, and the intermediate tape composite stiffener.

Clause 3. The stringer assembly of clause 2, wherein the composite base is an interleaved skin.

Clause 4. The stringer assembly of any one of clauses 1-3, wherein the intermediate tape composite stiffener is bonded to each of the first fabric composite stiffener and the second fabric composite stiffener.

Clause 5. The stringer assembly of clause 4, wherein the intermediate tape composite stiffener is bonded to the web portion and the curved portion of each of the first fabric composite stiffener and the second fabric composite stiffener.

Clause 6. The stringer assembly of any one of clauses 1-5, wherein an interior radius (R) of the curved portion is between 3-10 millimeters.

Clause 7. The stringer assembly of any one of clauses 1-6, wherein the intermediate tape composite stiffener comprises outer layer tapes, having a 0°-match to a contacting fabric of the web portion of each of the first fabric composite stiffener and the second fabric composite stiffener.

Clause 8. The stringer assembly of any one of clauses 1-7, wherein the intermediate tape composite stiffener comprises a unidirectional tape reinforcement material.

Clause 9. The stringer assembly of any one of clauses 1-8, wherein a composition of the intermediate tape composite stiffener is substantially uniform throughout an entire volume of the intermediate tape composite stiffener.

Clause 10. The stringer assembly of any one of clauses 1-9, wherein:
the intermediate tape composite stiffener and the web portion of each of the first fabric composite stiffener and the second fabric composite stiffener form a neck portion, away from the tapered-out edge; and
a thickness ratio of the intermediate tape composite stiffener relative to the neck portion is at least 0.3.

Clause 11. The stringer assembly of clause 10, wherein a thickness ratio of the web portion, at the neck portion, relative to the neck portion is less than 0.5.

Clause 12. The stringer assembly of clause 10, wherein a thickness ratio of the web portion, at a widest point of the tapered-out edge, relative to the web portion, at the neck portion, is between about 1.2 and 1.6.

Clause 13. The stringer assembly of any one of clauses 1-12, wherein the flange portion comprises a tapered-in edge.

Clause 14. The stringer assembly of any one of clauses 1-13, wherein the web portion and the flange portion of each of the first fabric composite stiffener and the second fabric composite stiffener are substantially perpendicular.

Clause 15. A method of forming a stringer assembly, the method comprising:
joining a first end of an intermediate tape composite stiffener to a composite base, the first end comprising flared-out edges; and
joining a first fabric composite stiffener and a second fabric composite stiffener to the composite base and to the intermediate tape composite stiffener,
wherein each of the first fabric composite stiffener and the second fabric composite stiffener comprises a web portion, a flange portion, and a curved portion, the curved portion disposed between the web portion and the flange portion and conforming to a corresponding one of the flared-out edges of the intermediate tape composite stiffener.

Clause 16. The method of clause 15, wherein:
the web portion comprises a tapered-out edge; and
a second end of the intermediate tape composite stiffener, opposite of the first end, is positioned between the tapered-out edge of the first fabric composite stiffener and the tapered-out edge of the second fabric composite stiffener.

Clause 17. The method of any one of clauses 15-16, wherein the flange portion of each of the first fabric composite stiffener and the second fabric composite stiffener conforms to the composite base.

Clause 18. The method of any one of clauses 15-17, wherein the flange portion each of the first fabric composite stiffener and the second fabric composite stiffener comprises a tapered-in edge extending away from the intermediate tape composite stiffener.

Clause 19. The method of any one of clauses 15-18, further comprising forming the first fabric composite stiffener and the second fabric composite stiffener.

Clause 20. The method of clause 19, wherein forming the first fabric composite stiffener and the second fabric composite stiffener comprises:
forming a composite layup, comprising a first layup end and a second layup end, opposite of the first layup end;
building up a layup tapered-out edge at each of the first layup end and the second layup end;
forming a tapered layup opening between the first layup end and the second layup end; and
cutting the composite layup between the first layup end and the second layup end, thereby forming the first fabric composite stiffener and the second fabric composite stiffener.

Clause 21. The method of clause 20, wherein the tapered layup opening is formed in an intermediate portion between the first layup end and the second layup end.

Clause 22. The method of clause 20-21, wherein the composite layup is cut in an intermediate p between the first layup end and the second layup end.

Clause 23. The method of clause 20-22, further comprising bending each of the first fabric composite stiffener and the second fabric composite stiffener.

Clause 24. The method of clause 23, wherein each of the first fabric composite stiffener and the second fabric composite stiffener is bent against the intermediate tape composite stiffener until the curved portion conforms to the flared-out edges of the intermediate tape composite stiffener.

Clause 25. The method of any one of clauses 15-24, further comprising forming the intermediate tape composite stiffener, wherein forming the intermediate tape composite stiffener comprises:

forming an intermediate composite layup, comprising a first intermediate layup end and a second intermediate layup end, opposite of the first intermediate layup end; and building up intermediate layup tapered-out edges at the first intermediate layup end.

Clause 26. The method of any one of clauses 15-25, further comprising applying an adhesive to the composite base, wherein the adhesive joins the first end of the intermediate tape composite stiffener and each of the first fabric composite stiffener and the second fabric composite stiffener to the composite base.

Clause 27. The method of clause 26, wherein the adhesive gap-fills spacing between the flared-out edges and the curved portion of each of the first fabric composite stiffener and the second fabric composite stiffener.

Clause 28. The method of any one of clauses 15-27, further comprising co-curing the intermediate tape composite stiffener, the first fabric composite stiffener, and the second fabric composite stiffener.

Clause 29. A method for forming a stringer assembly, the method comprising:

forming a first fabric composite stiffener and a second fabric composite stiffener;

joining a first end of an intermediate tape composite stiffener to a composite base, the first end comprising flared-out edges; and bending the first fabric composite stiffener and the second fabric composite stiffener to conform to the composite base and to the intermediate tape composite stiffener, wherein each of the first fabric composite stiffener and the second fabric composite stiffener comprises a web portion, a flange portion, and a curved portion, disposed between the web portion and the flange portion; and wherein, after bending, the curved portion of each of the first fabric composite stiffener and the second fabric composite stiffener conforms to the flared-out edges of the intermediate tape composite stiffener.

Clause 30. The method of clause 29, wherein, after bending, the web portion of each of the first fabric composite stiffener and the second fabric composite stiffener conforms to the intermediate tape composite stiffener.

Clause 31. The method of any one of clauses 29-30, wherein, after bending, flange portion of each of the first fabric composite stiffener and the second fabric composite stiffener conforms to the composite base.

Clause 32. The method of any one of clauses 29-31, wherein, prior to bending, each of the first fabric composite stiffener and the second fabric composite stiffener are substantially planar.

Clause 33. The method of any one of clauses 29-32, further comprising joining the first fabric composite stiffener and the second fabric composite stiffener to each of the composite base and the intermediate tape composite stiffener.

Clause 34. The method of clause 33, wherein joining the first fabric composite stiffener and the second fabric composite stiffener to each of the composite base and the intermediate tape composite stiffener comprises co-curing the intermediate tape composite stiffener, the first fabric composite stiffener, and the second fabric composite stiffener.

Clause 35. The method of any one of clauses 29-34, wherein:

the web portion comprises a tapered-out edge; and a second end of the intermediate tape composite stiffener, opposite of the first end, is positioned between the tapered-out edge of the first fabric composite stiffener and the tapered-out edge of the second fabric composite stiffener.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A stringer assembly comprising:
   a first fabric composite stiffener and second fabric composite stiffener, each comprising a web portion, a flange portion, and a curved portion, disposed between the web portion and the flange portion, wherein the web portion comprises a tapered-out edge that increases in thickness; and
   an intermediate tape composite stiffener, disposed between the first fabric composite stiffener and the second fabric composite stiffener and comprising flared-out edges, each flared-out edge contacting and conforming to a corresponding one of the curved portions of the first fabric composite stiffener and the second fabric composite stiffener, wherein the intermediate tape composite stiffener extends from the curved portions to the taper-out edges of the first and second fabric composite stiffeners.

2. The stringer assembly of claim 1, further comprising a composite base and an adhesive, disposed between and adhering to the composite base and each of the first fabric composite stiffener, the second fabric composite stiffener, and the intermediate tape composite stiffener.

3. The stringer assembly of claim 1, wherein the intermediate tape composite stiffener is bonded to each of the first fabric composite stiffener and the second fabric composite stiffener.

4. The stringer assembly of claim 1, wherein:
   the intermediate tape composite stiffener and the web portion of each of the first fabric composite stiffener and the second fabric composite stiffener form a neck portion, away from the tapered-out edge; and
   a thickness ratio of the intermediate tape composite stiffener relative to the neck portion is at least 0.3.

5. The stringer assembly of claim 1, wherein the flange portion of each of the first fabric composite stiffener and the second fabric composite stiffener comprises a tapered-in edge that decreases in thickness.

6. The stringer assembly of claim 1, wherein the web portion and the flange portion of each of the first fabric composite stiffener and the second fabric composite stiffener are substantially perpendicular.

7. A method of forming a stringer assembly, the method comprising:
  joining a first end of an intermediate tape composite stiffener to a composite base, the first end comprising flared-out edges; and
  joining a first fabric composite stiffener and a second fabric composite stiffener to the composite base and to the intermediate tape composite stiffener,
    wherein each of the first fabric composite stiffener and the second fabric composite stiffener comprises a web portion, a flange portion, and a curved portion, the curved portion disposed between the web portion and the flange portion and conforming to a corresponding one of the flared-out edges of the intermediate tape composite stiffener, wherein each web portion comprises a tapered-out edge that increases in thickness, and wherein the intermediate tape composite stiffener extends from the curved portions to the taper-out edges of the first and second fabric composite stiffeners.

8. The method of claim 7, wherein:
  a second end of the intermediate tape composite stiffener, opposite of the first end, is positioned between the tapered-out edge of the first fabric composite stiffener and the tapered-out edge of the second fabric composite stiffener.

9. The method of claim 7, further comprising forming the first fabric composite stiffener and the second fabric composite stiffener.

10. The method of claim 9, wherein forming the first fabric composite stiffener and the second fabric composite stiffener comprises:
  forming a composite layup, comprising a first layup end and a second layup end, opposite of the first layup end;
  building up a layup tapered-out edge having an increasing thickness at each of the first layup end and the second layup end;
  forming a tapered layup opening between the first layup end and the second layup end; and
  cutting the composite layup between the first layup end and the second layup end, thereby forming the first fabric composite stiffener and the second fabric composite stiffener.

11. The method of claim 10, further comprising bending each of the first fabric composite stiffener and the second fabric composite stiffener.

12. The method of claim 11, wherein each of the first fabric composite stiffener and the second fabric composite stiffener is bent against the intermediate tape composite stiffener until the curved portion conforms to the flared-out edges of the intermediate tape composite stiffener.

13. The method of claim 7, further comprising forming the intermediate tape composite stiffener, wherein forming the intermediate tape composite stiffener comprises:
  forming an intermediate composite layup, comprising a first intermediate layup end and a second intermediate layup end, opposite of the first intermediate layup end; and
  building up intermediate layup tapered-out edges at the first intermediate layup end.

14. A method for forming a stringer assembly, the method comprising:
  forming a first fabric composite stiffener and a second fabric composite stiffener;
  joining a first end of an intermediate tape composite stiffener to a composite base, the first end comprising flared-out edges; and
  bending the first fabric composite stiffener and the second fabric composite stiffener to conform to the composite base and to the intermediate tape composite stiffener,
    wherein each of the first fabric composite stiffener and the second fabric composite stiffener comprises a web portion, a flange portion, and a curved portion, disposed between the web portion and the flange portion, wherein the web portion comprises a tapered-out edge that increases in thickness; and
    wherein, after bending, the curved portion of each of the first fabric composite stiffener and the second fabric composite stiffener conforms to a corresponding one of the flared-out edges of the intermediate tape composite stiffener,
    wherein the intermediate tape composite stiffener extends from the curved portions to the taper-out edges of the first and second fabric composite stiffeners.

15. The method of claim 14, wherein, after bending, the web portion of each of the first fabric composite stiffener and the second fabric composite stiffener conforms to the intermediate tape composite stiffener.

16. The method of claim 14, wherein, after bending, flange portion of each of the first fabric composite stiffener and the second fabric composite stiffener conforms to the composite base.

17. The method of claim 14, wherein, prior to bending, each of the first fabric composite stiffener and the second fabric composite stiffener are substantially planar.

18. The method of claim 14, further comprising joining the first fabric composite stiffener and the second fabric composite stiffener to each of the composite base and the intermediate tape composite stiffener.

19. The method of claim 18, wherein joining the first fabric composite stiffener and the second fabric composite stiffener to each of the composite base and the intermediate tape composite stiffener comprises co-curing the intermediate tape composite stiffener, the first fabric composite stiffener, and the second fabric composite stiffener.

20. A method for forming a stringer assembly, the method comprising:
  joining a first end of an intermediate tape composite stiffener to a composite base, the first end comprising flared-out edges that increase in thickness; and
  joining a first fabric composite stiffener and a second fabric composite stiffener to the composite base and to the intermediate tape composite stiffener,
    wherein each of the first fabric composite stiffener and the second fabric composite stiffener comprises a web portion, a flange portion, and a curved portion, the curved portion disposed between the web portion and the flange portion and conforming to a corresponding one of the flared-out edges of the intermediate tape composite stiffener,
    wherein the web portion comprises a tapered-out edge that increases in thickness and a second end of the intermediate tape composite stiffener, opposite of the first end, is positioned between the tapered-out edge of the first fabric composite stiffener and the tapered-out edge of the second fabric composite stiffener.

* * * * *